Dec. 13, 1927.
J. D. LALOR
1,652,173
FILTERING APPARATUS
Filed Feb. 18, 1925   2 Sheets-Sheet 1
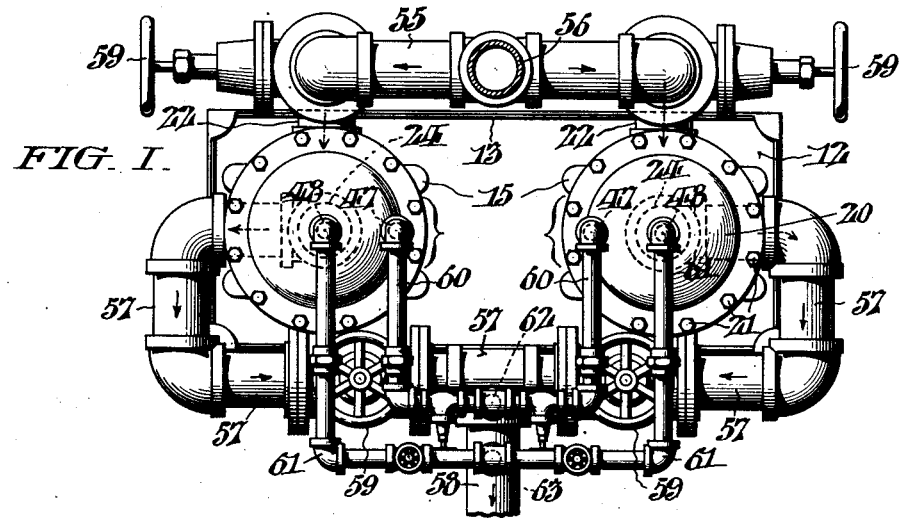
FIG. I.
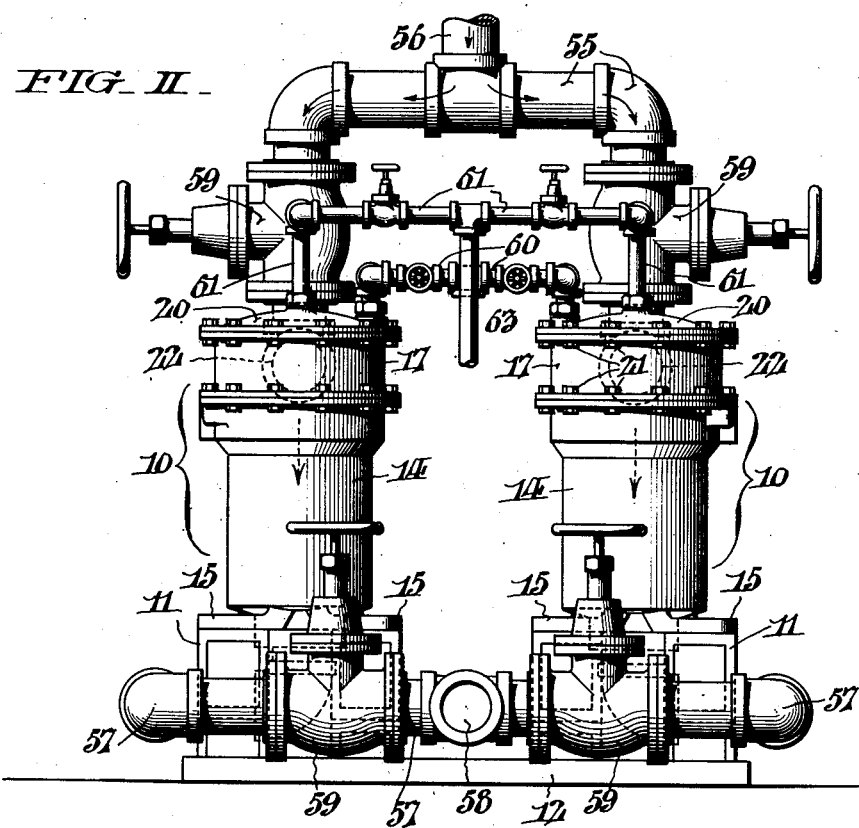
FIG. II.
WITNESSES:
INVENTOR:
James D. Lalor,
BY
ATTORNEYS.

Dec. 13, 1927.
J. D. LALOR
1,652,173
FILTERING APPARATUS
Filed Feb. 18, 1925    2 Sheets-Sheet 2
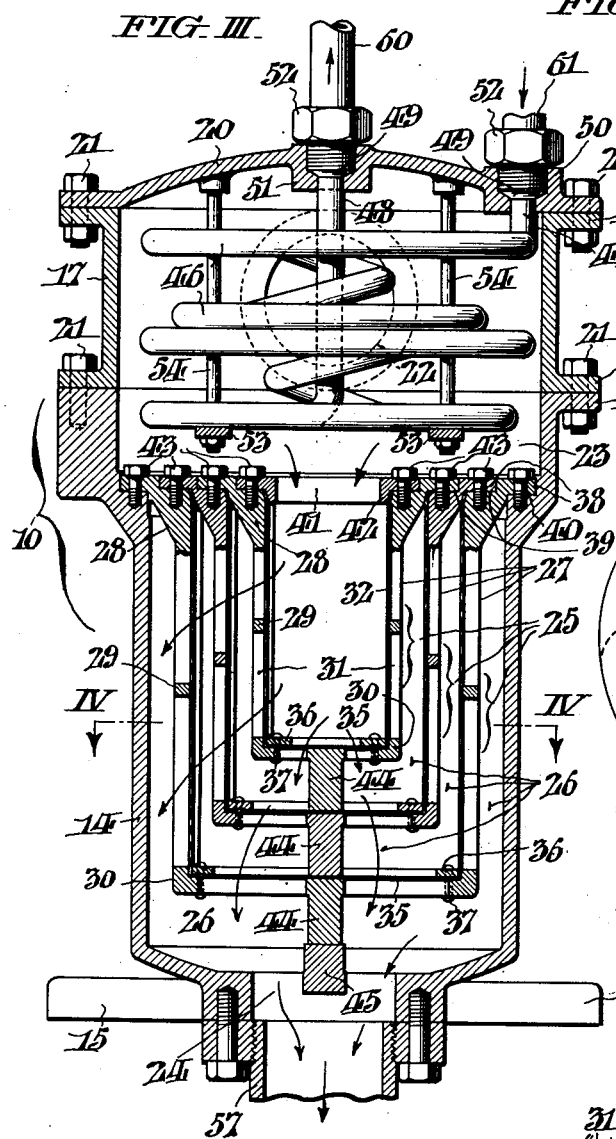
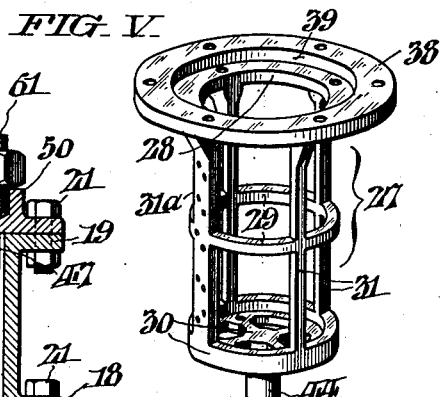
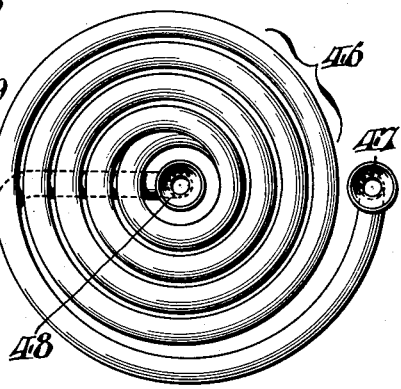
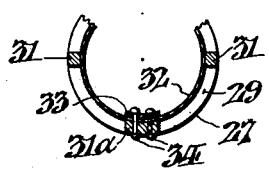
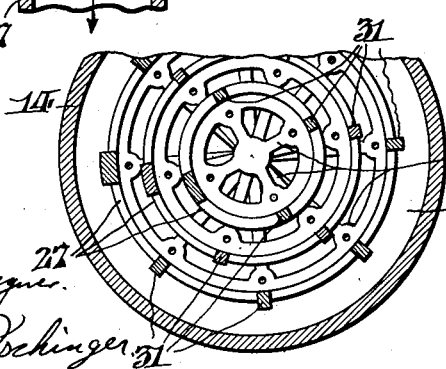
WITNESSES:
John C. Burger
Alfred E. Ischinger
INVENTOR:
James D. Lalor,
BY Fraley Paul
ATTORNEYS.

Patented Dec. 13, 1927.

1,652,173

UNITED STATES PATENT OFFICE.

JAMES D. LALOR, OF BALTIMORE, MARYLAND, ASSIGNOR TO THE LALOR FUEL OIL SYSTEM COMPANY, INC., OF BALTIMORE, MARYLAND, A CORPORATION OF MARYLAND.

FILTERING APPARATUS.

Application filed February 18, 1925. Serial No. 10,046.

This invention relates to filtering apparatus, more particularly to a type intended for continuous operation in filtering a steady flow of fluid. One instance exemplifying a practical use of such an apparatus is in connection with oil burning systems wherein it is of the utmost importance that all solid or congealed suspensions be removed from the oil before the same is fed to the burners so as to preclude clogging of their discharge orifices.

My present invention is directed toward provision of a filtering apparatus of the character referred to comprising a number of independent component filter units capable of selective use so that at least one of them may always be maintained available for service and substituted for another needing cleaning after extensive service.

My invention is further concerned with improvements in the filter units themselves calculated to facilitate filtration by preheating of the fluid to lower its viscosity; as well as with provisions enabling such filtration to be carried on in successive stages by passage of the fluid through a series of filter elements with progressively-graduated interstices.

A further object is to secure the advantages noted in the preceding paragraph in a structure that is amply sturdy to withstand fluid flow under high pressures, and extremely compact, yet with its constituent parts readily accessible and removable for cleaning or replacement.

In the drawings. Fig. I is a plan view of a filtering apparatus conveniently embodying my invention.

Fig. II is a front elevation of the organization.

Fig. III is a sectional elevation on a larger scale of one of the filter units.

Fig. IV is a partial plan section, taken as indicated by the arrows IV—IV in Fig. III, with the screen linings of the filtering elements omitted.

Fig. V is a perspective view of the frame of one of the removable filter elements.

Fig. VI is a fragmentary detail view showing the manner in which the screen linings are secured within the frames of the filter elements; and Fig. VII is a plan view of the steam coil whereby the fluid is preheated.

In the typical embodiment illustrated, the filtering apparatus of my invention is shown as characterized by a number of vertical filter units each comprehensively designated 10. These units 10 are mounted upon hollow pedestals 11 that are in turn supported on a common base plate 12 having an upstanding perimetric flange 13 so as to be serviceable as a drip pan to catch any leakage from the units 10, or the piping connections to them. In view of the fact that the units 10 are of identical construction, I will describe but one of them in detail with the understanding that such description equally applies to the other, thereby avoiding unnecessary repetition in referring to the various similar constituent parts.

With reference for the time being to Fig. III, it will be observed that the casing body of the unit 10 is constructed in two parts. The lower or main section 14 is generally cylindric, having a closed bottom from which extend radially a series of supporting feet 15, and an open top with an outwardly-projecting head flange 16. The upper or auxiliary casing section 17 is of lesser vertical depth than the main section 14 but configured cylindrically to form a direct continuation of the latter. This auxiliary section 17 has a flange 18 about its bottom end to correspond with the flange 16 of the main section 14, as well as a flange 19 about its top for reception of a cover 20, the several parts being detachably secured together by screw bolts 21. The fluid to be filtered is introduced through a lateral port 22 in the auxiliary section 17 to flow downward in the closed vertical chamber 23 afforded jointly by the casing parts, while it discharges through an axial port 24 in the bottom of the main section 14.

Within its hollow, the main casing section 14 accommodates a pack of basket-like filtering elements 25 which are exactly identical in form but graduated as to size so as to be internesting with provision at the same time, of ample fluid flow intervals 26 between their respective sides and bottoms, as well as like spaces between the outermost one of the group and the contiguous cylindric wall and base of the casing 14. Each of these filter elements 25 comprises a skeletonized frame 27 (see Fig. V) with an upper ring 28, an intermediate ring 29, and a bottom spider 30, all of which are united to form a unitary integral structure by a series of spaced verticals 31, whereof one indicated 31ᵃ is—in each instance—perforated along opposite side edges as shown, for a purpose to be presently explained. This skeleton frame 27 serves as a rigid backing for a foraminous lining 32 such for example as wire mesh or perforated metal, the same being fashioned from sheet material of such length as to form, upon bending, a cylinder of the proper size with the ends of the sheet abutting. In assembling, the butt juncture is aligned with the medial of the frame vertical 31ᵃ (see Fig. VI), a flat lapping strip 33 applied thereover, and the parts permanently secured together by rivets or other fastening means 34 taking into the apertures of said vertical 31ᵃ. Disks 35, likewise of reticulate material, are employed to form the bottoms of the baskets 25, the same being— in each instance—secured to the spider 30 of the frame 27 by a clamp ring 36 and rivets 37 as shown in Fig. III. Although I have described the linings of the baskets as being of similar material I prefer, for the purpose of securing progressive or stagewise filtration, screenings differing in mesh or size of interstices, the coarsest being used for the inner basket, the finest for the outer, and grated for the intermediate one or ones—as the case may be—in accordance with the size of the unit.

The relative allocation of the several filtering elements or baskets 25 is determined by peripheral flanges 38 about the upper rings 28 of the frames 27, the flange of one seating in a corresponding circular recess in the top of another as clearly shown in Fig. III, and the flange of the outermost basket on an internal recessed circumferential ledge 40 in the main casing section 14 at a level slightly below the top thereof. As a means to protect the top rim of the lining 32 of the innermost basket 25 against the direct action of the fluid flow from above, and at the same time assist securing the lining to its frame 27, I employ a flange annulus 41 equipped with a depending lapping bead 42 and adapted to rest in the circular recess 39 of said frame. By such interfitting as between the flanges 38 and recesses 39, as well as with regard to the annulus 41, I secure a flush top for the entire pack assemblage devoid of any projections resistive to fluid flow except for the cap screws 43 used in securing these parts one to another and to the casing section 14. Downward axial projections 44 on the bottom spiders 30 of the frames 27 function as struts to assist, by cooperation with a sustaining bar 45 across the outlet port 24 of the casing section 14, to support the elements 25 against downward pressure of the fluid flow. Particular attention is directed to the arrangement of the inter-nesting baskets 25 circumferentially in accordance with Fig. IV in which the linings have been omitted. By disposing the frames 27 with their verticals 31, 31ᵃ, and the arms of their base spiders 30 relatively staggered as shown, a more uniform distribution of the flow is secured to the avoidance of premature clogging of the screen linings 32.

Disposed in the clear space forming the upper part of the chamber 23 above the pack of filtering elements 25, is a heating means in the form of a steam coil 46 with its convolutions so arranged as to expose the maximum surface to the flow of the fluid. The terminals 47, 48 of the coil are flared as at 49 and respectively anchored in axially apertured bosses 50, 51 of the cover 20 by means of nipple nuts 52 in the conventional manner shown. The coil 46 is otherwise supported in suspension with the assistance of a pair of underlying cross bars 53 hung by drop rods 54 from the cover 20. By virtue of attachment to the cover 20, the heating coil 46 is removable with the latter, thereby rendering the pack of filtering elements 25 directly accessible from above. By removing the bolts 43 which hold the outermost element 25 to the casing 14, the whole pack may be withdrawn as a unit, and the elements thereafter successively separated as may be required from time to time to clean out the accumulated solid matter trapped from the passing fluid.

In operation of the filter unit, the fluid continuously entering the chamber 23 through the port 22, first encounters the steam coil 46 being thereby effectively heated and its viscosity lowered to facilitate filtration. In passing downward in the chamber 23, the fluid first enters the innermost filtering basket 25 whereby the coarser suspended matter is trapped, and, in its further progress, successively encounters the finer screen linings 32 of the remaining baskets 25 before discharging through the outlet port 24, being thus cleansed of solid foreign substances or congealed suspensions. It is to be remarked that the auxiliary section 17 serves merely to provide an extension in the form of a clear space for accommodation of the coil 46. Obviously, in instances when heating of the fluid is not essential, the auxiliary section 17 and the coil 46 may be entirely dispensed with and the cover 20 secured directly to the top flange 16 of the main casing section 14.

The construction and operation of the individual filter units 10 being now thoroughly understood, I will next proceed to describe the manner in which they are grouped and connected to enable interchangeable use in the complete organization illustrated in Figs. I and II. The fluid inlets 22 of the unit casings 10 are, accordingly, coordinated by a manifold 55 which is built up from standard pipe fittings and connected to a flow main 56. The fluid outlets 24 are similarly coordinated by a common manifold 57 connected to a return main 58. Hand valves 59 in the manifolds 55, 57 adjacent the inlets 22 and outlets 24, enable the respective units 10 to be individually cut in or out in a manner perfectly obvious to those generally familiar with apparatus of this sort. The terminals 47, 48 of the steam coils 46 in the filter units are likewise and for identical reasons connected in parallel by valved piping 60, 61 for communication with supply and return mains 62, 63 respectively. With these dual provisions, one of the units 10 may be maintained in condition and available for substitution in place of the other requiring either cleaning or replacement of any of its parts, thereby obviating the necessity for at any time shutting down the system of which the apparatus constitutes a part.

Having thus described my invention, I claim:

1. A fluid filtering apparatus comprising a number of independent vertical cylindric filtering units, said units including heating means above the filtering units and having inlets and outlets at the upper and lower ends, manifolds respectively connecting said inlets and outlets to flow and return mains, similar manifolds connecting the terminals of the heating means, and valves enabling said filtering units to be interchangeably used.

2. A fluid filtering apparatus characterized by component units each comprising a casing affording a flow chamber for the fluid, and a multiplicity of foraminous inter-nesting basket-like filtering elements having co-axial supporting struts disposed in the fluid flow within each casing, and said elements being allocated by peripheral flanges fitting in corresponding circumferential recesses so as to present a flush top.

3. A fluid filtering apparatus characterized by component units each comprising superposed components, the upper of which sustains heating means while the lower affords a filtering chamber for the fluid, and a multiplicity of removable inter-nesting foraminous filtering elements having co-axial supporting struts disposed in the fluid flow within the casing, the interstices of said elements being graduated for progressive filtration of the flow, and the aforesaid struts co-operative with a sustaining bar across the filter outlet.

4. A fluid filtering apparatus characterized by component units each comprising superposed components, the upper of which sustains heating means while the lower affords a filtering chamber for the fluid, and a multiplicity of removable foraminous basket-like filtering elements having co-axial supporting struts disposed in the fluid flow within the casing, said elements varying in size so as to be inter-nesting with provision of flow intervals between their respective side walls and bottoms, and the aforesaid struts alignedly co-operating with a sustaining bar across the filter casing outlet.

5. A fluid filtering apparatus characterized by component units each comprising superposed components, the upper of which sustains heating means while the lower affords a filtering chamber for the fluid, a multiplicity of removable foraminous basket-like filtering elements disposed in the fluid flow within the casing, said elements varying in size so as to be inter-nesting with provision of flow intervals between their respective side walls and bottoms, and having depending projections forming bracing struts between their respective bottoms and the base of said chamber.

6. A fluid filtering apparatus comprising component units each comprising a casing affording a flow chamber for the fluid, and a multiplicity of removable inter-nesting basket-like filter elements each composed of a skeletonized outer frame with spaced horizontal rings and integral connecting verticals, a lining formed of foraminous sheet material with the edges of the material abutting along the medial of one of the frame members aforesaid, and a strip to overlap the butt joint for securing the lining to the frame member.

7. A fluid filtering apparatus characterized by component units each comprising a casing affording a flow chamber for the fluid, and a multiplicity of removable inter-nesting basket-like filtering elements each composed of a skeletonized outer frame member with spaced horizontal rings, integral connecting verticals and integral depending projections forming bracing struts between their respective bottoms and the base of the chamber, and a lining of foraminous sheet material attached within the skeleton frame of each of said elements.

8. A fluid filtering apparatus characterized by component units each comprising a casing affording a flow chamber for the fluid, and a multiplicity of removable inter-nesting foraminous basket-like filtering elements each having at the top a lateral projecting circumferential flange and at the bottom a co-axial supporting strut, the flange of the outermost element of the group resting upon a recessed annular shoulder within the casing, with the flange of each of the others in a corresponding recess in the top of the next adjacent element so as to present a flush top surface, and the aforesaid struts co-operating with a sustaining bar across the filter casing outlet.

9. A fluid filtering apparatus characterized by component filter units each comprising superposed components jointly affording a flow chamber for the fluid, in combination with a removable heating means and removable inter-nested filter means disposed in the flow of the fluid within the chamber, said heating means being located within the flow chamber above the filter means, and wholly supported by a removable cover for said flow chamber.

10. A fluid filtering apparatus characterized by component filter units each comprising superposed components jointly affording a flow chamber for the fluid, in combination with inter-nested filtering means disposed in the flow of the fluid in the lower part of the casing, and a heating means supported wholly within a clear space above the filtering means and removably carried by the cover of said flow chamber.

11. A fluid filtering apparatus characterized by component filtering units each comprising a casing affording a flow chamber for the fluid, and having a detachable cover, in combination with filtering means disposed in the lower part of the casing, and heating means in a clear space above the filtering means, said heating means being supported by the cover aforesaid so as to be removable therewith to afford direct access to the filtering means.

12. A fluid filtering apparatus characterized by component filtering units each comprising a casing affording a flow chamber for the fluid and having a detachable cover, in combination with filtering means disposed in the lower part of the casing, a steam heating coil in a clear space above the filtering element, and means for supporting the coil in suspension from the cover so as to be removable therewith.

13. A fluid filtering apparatus characterized by component filtering units each comprising a casing with a main vertical section having a closed bottom and open top, an auxiliary section surmounting the bottom section, and a detachable cover capping the auxiliary section, forming jointly a closed flow chamber for the fluid, in combination with a foraminous basket-like filter means accommodated with capacity for ready removal in the lower section of the casing, a heating coil in the clear space afforded by the auxiliary section, and means for supporting the coil in suspension from the casing cover so as to be removable therewith in affording access to said filtering element.

In testimony whereof, I have hereunto signed my name at Philadelphia, Pennsylvania, this 13th day of February 1925.

JAMES D. LALOR.